US010909205B2

(12) United States Patent
Gueta (10) Patent No.: US 10,909,205 B2
(45) Date of Patent: Feb. 2, 2021

(54) SYSTEM AND METHOD FOR WEB-SESSION RECORDING

(71) Applicant: Glassbox Ltd., Petah Tikva (IL)

(72) Inventor: Yaron Gueta, Hod Hasharon (IL)

(73) Assignee: Glassbox Ltd, Petah Tikva (IL)

( * ) Notice: Subject to any disclaimer, the term of this patent is extended or adjusted under 35 U.S.C. 154(b) by 0 days.

(21) Appl. No.: 16/260,128

(22) Filed: Jan. 29, 2019

(65) Prior Publication Data

US 2019/0243858 A1    Aug. 8, 2019

Related U.S. Application Data

(60) Provisional application No. 62/626,104, filed on Feb. 4, 2018.

(51) Int. Cl.
*H04L 29/08* (2006.01)
*G06F 16/955* (2019.01)
*G06F 11/30* (2006.01)
*G06K 9/62* (2006.01)

(52) U.S. Cl.
CPC ........ *G06F 16/955* (2019.01); *G06F 11/3006* (2013.01); *G06K 9/6231* (2013.01); *H04L 67/025* (2013.01); *H04L 67/04* (2013.01); *H04L 67/142* (2013.01); *H04L 67/22* (2013.01)

(58) Field of Classification Search
CPC .............. G06F 16/955; G06F 11/3006; G06F 16/9562; H04L 67/04; H04L 67/22; H04L 67/025; H04L 67/42; H04L 67/14; H04L 67/02; G06K 9/6231
See application file for complete search history.

(56) References Cited

U.S. PATENT DOCUMENTS

| | | | |
|---|---|---|---|
| 7,941,525 B1 | 5/2011 | Yavilevich | |
| 8,868,533 B2 | 10/2014 | Powell et al. | |
| 2002/0065912 A1* | 5/2002 | Catchpole | G06F 16/954 709/224 |
| 2007/0106692 A1* | 5/2007 | Klein | G06F 16/954 |
| 2012/0084437 A1* | 4/2012 | Wenig | H04L 67/14 709/224 |
| 2012/0173966 A1* | 7/2012 | Powell | H04L 67/02 715/234 |
| 2014/0108911 A1 | 4/2014 | Damale | |
| 2016/0170943 A1* | 6/2016 | Maddali | G06F 16/986 715/234 |
| 2016/0266730 A1* | 9/2016 | Franke | G06F 11/3438 |
| 2017/0019489 A1* | 1/2017 | Churchill | G06F 11/3414 |

* cited by examiner

*Primary Examiner* — Nicholas R Taylor
*Assistant Examiner* — Sanjoy Roy
(74) *Attorney, Agent, or Firm* — S.J. Intellectual Property LTD (57) ABSTRACT

A web-session recording system comprising at least one processing resource configured to: provide a webpage, the webpage comprising (a) one or more references to external resources, external to the webpage, and (b) instructions executable by a web browser for recording a web-session, wherein executing the instructions results in one or more of the external resources being uploaded to the web-session recording system, being upload selected resources, and at least another one of the external resources not being uploaded to the web-session recording system, being non-upload resources; send the webpage to a plurality of clients, each requesting the webpage during a corresponding web-session; and receive, from each of the clients, the upload selected resources.

20 Claims, 4 Drawing Sheets

SYSTEM AND METHOD FOR WEB-SESSION RECORDING

TECHNICAL FIELD

The invention relates to a system and method for web-session recording.

BACKGROUND

Many solutions exist nowadays for recording and replaying web-sessions, inter alia for enabling website owners to obtain various insights on the users' interaction with their website.

One of the challenges of web-session recording is reproducing, with a high degree of accuracy, a specific user's web-session browsing one or more web pages. One of the challenges is due to the fact that the web pages, browsed by the user during the recorded web-session, regularly contain one or more references to external resources, such as: image files, Cascading Style Sheets (CSS), video files, etc. Such external resources may be changed (e.g. deleted, replaced, etc.) over time, specifically they can change between the time of recording the web-session and the time of replay of the same web-session. This may result in a replayed web-session that does not appear identical to the actual web-session the user experienced at the time it was recorded. This may be the case when the external resources are retrieved upon replaying the web-session, as a result of obtaining the current content referred to by the external reference, instead of the content that existed at the time the web-session was recorded, while the content changed between the time the web-session was recorded and the time the web-session was replayed.

Therefore, web-session recording solutions should capture these external resources as of the time of the web-session recording and upload them to be stored in a location accessible to a replay server, so that the correct content (as seen by the user when the recording took place) is displayed upon replay. However, existing web-session recording solutions do not efficiently solve this problem, as sending such external resources for storage (in a location accessible to a replay server) for every single user may result in degradation of the performance of the user's network access, as the up-link from the user's device to the network is commonly a bottleneck.

There is thus a need in the art for a new method and system for web-session recording.

References considered to be relevant as background to the presently disclosed subject matter are listed below. Acknowledgement of the references herein is not to be inferred as meaning that these are in any way relevant to the patentability of the presently disclosed subject matter.

US Patent Application No. 2014/0108911 (Demale) published on Apr. 17, 2014, discloses a capture and replay system identifies images displayed during an application session. A parser may generate Hypertext Markup Language (HTML) code from an application resource file or from the JSON post made by the application. A replay engine may use the HTML code to recreate at least some of the screens displayed during the application session. The capture and replay system may dynamically identify images that are not reproduced from the resources database and request an agent/(s) to asynchronously upload the image files associated with the images. The replay engine may use the uploaded image files to replay the application session. The capture and replay system may capture application sessions more efficiently by reproducing images from the resource file instead of capturing the images during the original application session and by dynamically requesting image files for the images were are not previously reproduced from the resource file. Once an image file is uploaded to server, it does not need to be requested again from any other agent.

U.S. Pat. No. 8,868,533 (Powell et al.) published on Oct. 21, 2014, discloses a monitoring system intelligently captures Document Object Model (DOM) events. The DOM events may provide state information that may not usually be captured during a web session. To reduce processing bandwidth, content identifiers may be used to represent some DOM events. Checkpoints may be identified during the web session and a current state of the webpage may be captured to provide replay synchronization. Different data may be captured based on a sequence and timing of the DOM events during the original web session. Data exchanged with third party websites also may be selectively captured to provide a more through simulation of the original web session.

U.S. Pat. No. 7,941,525 (Yavilevich) published on May 10, 2011, discloses a method for tracking an activity of a user, the method includes: downloading, over a network, web page content that comprises a tracking code; tracking, at least partially by executing the tracking code by a user computer, user activities that are responsive to at least a portion of the downloaded web page content, wherein the tracking comprises generating user activity information; compressing and buffering a portion of the user activity information; and transmitting to a tracking entity, at least a compressed portion of the user activity information when a first transmission criterion is fulfilled.

GENERAL DESCRIPTION

In accordance with a first aspect of the presently disclosed subject matter there is provided an agentless client web-session recording system comprising at least one processing resource configured to: obtain a webpage during a web-session, the webpage comprising (a) instructions executable by a web browser of a client for recording the web-session, and (b) one or more references to external resources, external to the webpage; execute the instructions by the web browser, wherein, according to the instructions, one or more of the external resources are identified for uploading to the server, being upload selected resources, and at least another one of the external resources are not identified for uploading to the server, being non-upload resources; and send the upload selected resources to a web-session recording server, thereby reducing an overall bandwidth requirement for recording the web-session, due to not sending the non-upload resources.

In some cases, the processing resource is further configured to utilize the upload selected resources received from at least two of the clients in order to replay a selected web-session of the web-sessions, including at least two of the external resources, wherein at least a first external resource of the external resources is received from a first client of the clients and a second external resource of the external resources is received from a second client of the clients.

In some cases, the upload selected resources are identified by random selection thereof out of all of the external resources.

In some cases, the upload selected resources are identified by random selection thereof out of a subset of the external resources, the subset being identified by the instructions.

In some cases, the upload selected resources are identified by random selection thereof out of a subset of the external resources not received as part of the received upload selected resources, the subset being identified by the instructions.

In some cases, the upload selected resources are specifically identified within the instructions In some cases, the upload selected resources are specifically identified within the instructions out of a subset of the external resources not received as part of the received upload selected resources.

In some cases, a number of the upload selected resources is limited for each client of the clients, in according to at least one of the following: (a) type of a device of the client; (b) type of the web browser; (c) bandwidth of a connection of the device; (d) number of the external resources; (e) size of the external resources and (f) time of day.

In some cases, a size of the upload selected resources is limited for each client of the clients, in according to at least one of the following: (a) type of a device of the client; (b) type of the web browser; (c) bandwidth of a connection of the device; (d) number of the external resources; (e) size of the external resources and (f) time of day.

In some cases, a software component configured to obtain one or more of the external resources not received as part of the received upload selected resources.

In some cases, the instructions are JavaScript instructions.

In some cases, the webpage further comprises a link to an external resource, capable of providing the instructions, and wherein the instructions are loaded from the external resource.

In accordance with a second aspect of the presently disclosed subject matter there is provided a web-session recording system comprising at least one processing resource configured to: provide a webpage, the webpage comprising (a) one or more references to external resources, external to the webpage, and (b) instructions executable by a web browser for recording a web-session, wherein executing the instructions results in one or more of the external resources being uploaded to the web-session recording system, being upload selected resources, and at least another one of the external resources not being uploaded to the web-session recording system, being non-upload resources; send the webpage to a plurality of clients, each requesting the webpage during a corresponding web-session; and receive, from each of the clients, the upload selected resources.

In some cases, the processing resource is further configured to utilize the upload selected resources received from at least two of the clients in order to replay a selected web-session of the web-sessions, including at least two of the external resources, wherein at least a first external resource of the external resources is received from a first client of the clients and a second external resource of the external resources is received from a second client of the clients.

In some cases, the upload selected resources are identified by random selection thereof out of all of the external resources.

In some cases, the upload selected resources are identified by random selection thereof out of a subset of the external resources not received as part of the received upload selected resources, the subset being identified by the instructions.

In some cases, the upload selected resources are specifically identified within the instructions out of a subset of the external resources not received as part of the received upload selected resources.

In some cases, a number of the upload selected resources is limited for each client of the clients, in according to at least one of the following: (a) type of a device of the client; (b) type of the web browser; (c) bandwidth of a connection of the device; (d) number of the external resources; (e) size of the external resources and (f) time of day.

In some cases, a size of the upload selected resources is limited for each client of the clients, in according to at least one of the following: (a) type of a device of the client; (b) type of the web browser; (c) bandwidth of a connection of the device; (d) number of the external resources; (e) size of the external resources and (f) time of day.

In some cases, the web-session recording system further comprises a software component configured to obtain one or more of the external resources not received as part of the received upload selected resources.

In some cases, the instructions are JavaScript instructions.

In some cases, the webpage further comprises a link to an external resource, capable of providing the instructions, and wherein the instructions are loaded from the external resource.

In accordance with a third aspect of the presently disclosed subject matter there is provided a web-session recording method comprising: providing a webpage, by a processing resource, the webpage comprising (a) one or more references to external resources, external to the webpage, and (b) instructions executable by a web browser for recording a web-session, wherein executing the instructions results in one or more of the external resources being uploaded to the web-session recording system, being upload selected resources, and at least another one of the external resources not being uploaded to the web-session recording system, being non-upload resources; sending, by the processing resource, the webpage to a plurality of clients, each requesting the webpage during a corresponding web-session; and receiving, by the processing resource, from each of the clients, the upload selected resources.

The web-session recording method of claim 19, further comprising utilizing, by the processing resource, the upload selected resources received from at least two of the clients in order to replay a selected web-session of the web-sessions, including at least two of the external resources, wherein at least a first external resource of the external resources is received from a first client of the clients and a second external resource of the external resources is received from a second client of the clients.

In some cases, the upload selected resources are identified by random selection thereof out of all of the external resources.

In some cases, the upload selected resources are identified by random selection thereof out of a subset of the external resources not received as part of the received upload selected resources, the subset being identified by the instructions.

In some cases, the upload selected resources are specifically identified within the instructions out of a subset of the external resources not received as part of the received upload selected resources.

In some cases, a number of the upload selected resources is limited for each client of the clients, in according to at least one of the following: (a) type of a device of the client; (b) type of the web browser; (c) bandwidth of a connection of the device; (d) number of the external resources; (e) size of the external resources and (f) time of day.

In some cases, a size of the upload selected resources is limited for each client of the clients, in according to at least one of the following: (a) type of a device of the client; (b)

type of the web browser; (c) bandwidth of a connection of the device; (d) number of the external resources; (e) size of the external resources and (f) time of day.

In some cases, the method further comprises obtaining, by a software component, one or more of the external resources not received as part of the received upload selected resources.

In some cases, the instructions are JavaScript instructions.

In some cases, the webpage further comprises a link to an external resource, capable of providing the instructions, and wherein the instructions are loaded from the external resource.

In accordance with a fourth aspect of the presently disclosed subject matter there is provided an agentless client web-session recording method comprising: obtaining, by a processing resource, a webpage during a web-session, the webpage comprising (a) instructions executable by a web browser of a client for recording the web-session, and (b) one or more references to external resources, external to the webpage; executing, by the processing resource, the instructions by the web browser, wherein, according to the instructions, one or more of the external resources are identified for uploading to the server, being upload selected resources, and at least another one of the external resources are not identified for uploading to the server, being non-upload resources; and sending, by the processing resource, the upload selected resources to a web-session recording server, thereby reducing an overall bandwidth requirement for recording the web-session, due to not sending the non-upload resources.

In some cases, the upload selected resources are identified by random selection thereof out of all of the external resources.

In some cases, the upload selected resources are identified by random selection thereof out of a subset of the external resources, the subset being identified by the instructions.

In some cases, the upload selected resources are specifically identified within the instructions.

In some cases, a number of the upload selected resources is limited, in according to at least one of the following: (a) type of a device of the client; (b) type of the web browser running on the device; (c) bandwidth of a connection of the device; (d) number of the external resources; (e) size of the external resources and (f) time of day.

In some cases, a size of the upload selected resources is limited, in according to at least one of the following: (a) type of a device of the client; (b) type of the web browser running on the device; (c) bandwidth of a connection of the device; (d) number of the external resources; (e) size of the external resources and (f) time of day.

In some cases, the instructions are JavaScript instructions.

In some cases, the webpage further comprises a link to an external resource, capable of providing the instructions, and wherein the instructions are loaded from the external resource.

In accordance with a fifth aspect of the presently disclosed subject matter there is provided a non-transitory computer readable storage medium having computer readable program code embodied therewith, the computer readable program code, executable by at least one processor of a computer to perform a method for web-session recording, the method comprising: providing a webpage, by a processing resource, the webpage comprising (a) one or more references to external resources, external to the webpage, and (b) instructions executable by a web browser for recording a web-session, wherein executing the instructions results in one or more of the external resources being uploaded to the web-session recording system, being upload selected resources, and at least another one of the external resources not being uploaded to the web-session recording system, being non-upload resources; sending, by the processing resource, the webpage to a plurality of clients, each requesting the webpage during a corresponding web-session; and receiving, by the processing resource, from each of the clients, the upload selected resources.

In accordance with a sixth aspect of the presently disclosed subject matter there is provided a non-transitory computer readable storage medium having computer readable program code embodied therewith, the computer readable program code, executable by at least one processor of a computer to perform a method for an agentless client web-session recording method, the method comprising: obtaining, by a processing resource, a webpage during a web-session, the webpage comprising (a) instructions executable by a web browser of a client for recording the web-session, and (b) one or more references to external resources, external to the webpage; executing, by the processing resource, the instructions by the web browser, wherein, according to the instructions, one or more of the external resources are identified for uploading to the server, being upload selected resources, and at least another one of the external resources are not identified for uploading to the server, being non-upload resources; and sending, by the processing resource, the upload selected resources to a web-session recording server, thereby reducing an overall bandwidth requirement for recording the web-session, due to not sending the non-upload resources.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "providing", "obtaining", "executing", "recording", "sending", "utilizing", "receiving" or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 1:
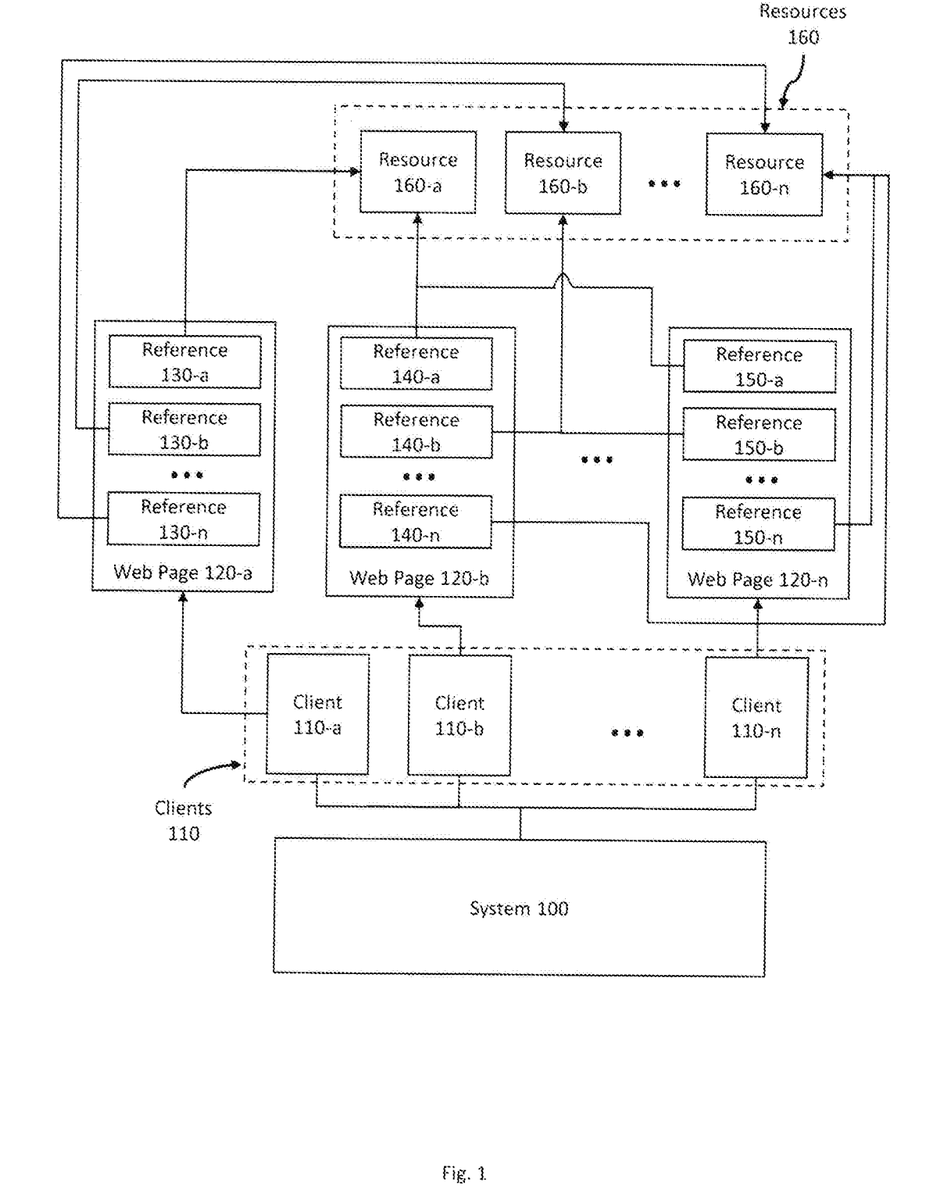
FIG. 1 is a block diagram schematically illustrating one example of an environment of a web-session recording system, in accordance with the presently disclosed subject matter.
Figure 2:
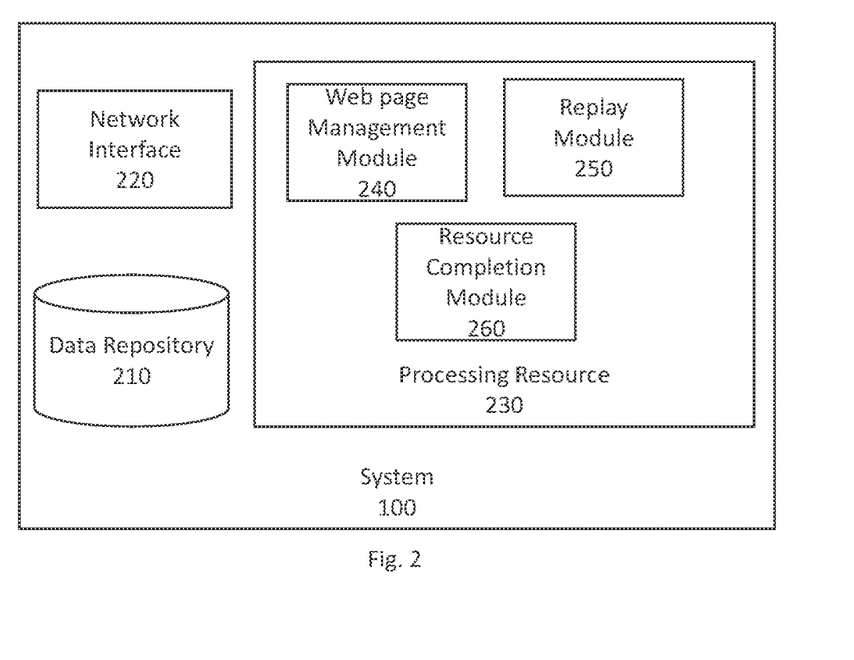
FIG. 2 is a block diagram schematically illustrating one example of a system for web-session recording, in accordance with the presently disclosed subject matter.
Figure 3:
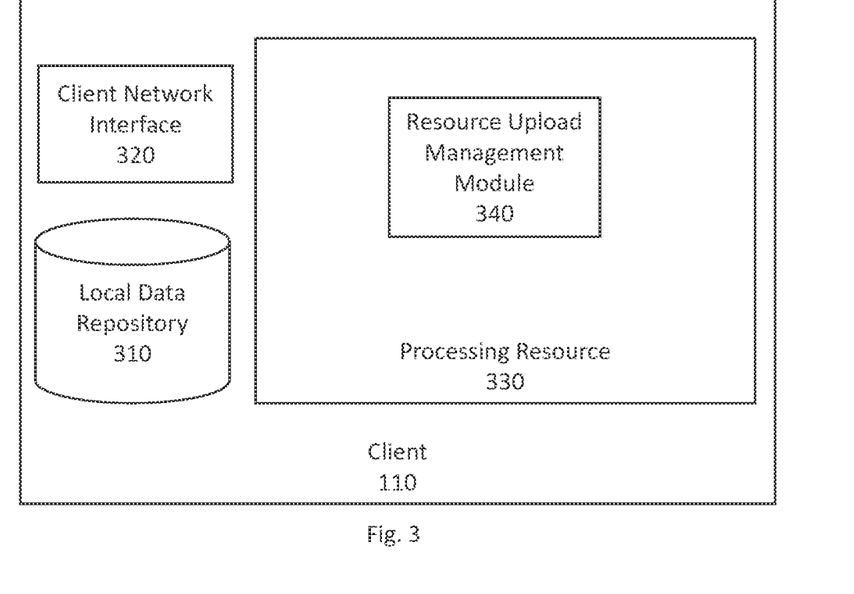
FIG. 3 is a block diagram schematically illustrating one example of an agentless client web-session recording system, in accordance with the presently disclosed subject matter.
Figure 4:
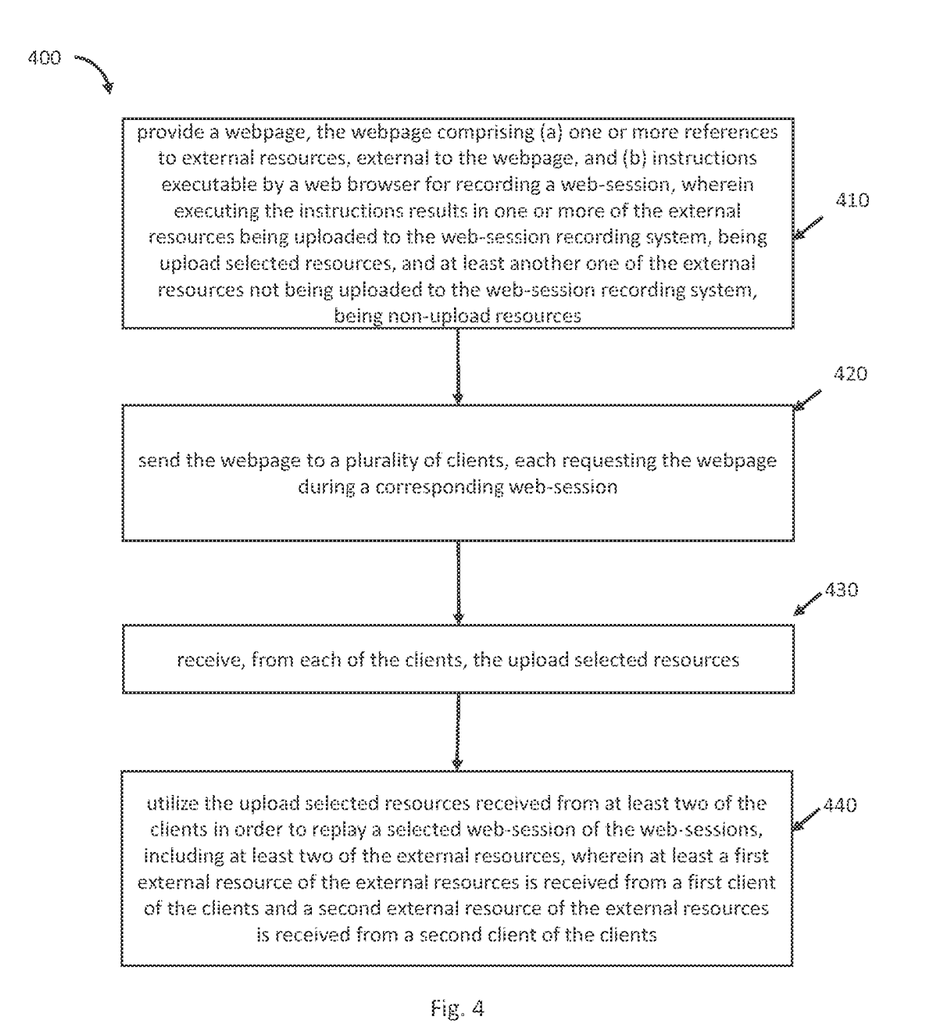
FIG. 4 is a flowchart illustrating one example of a sequence of operations carried out for web-session recording, in accordance with the presently disclosed subject matter.
Figure 5:
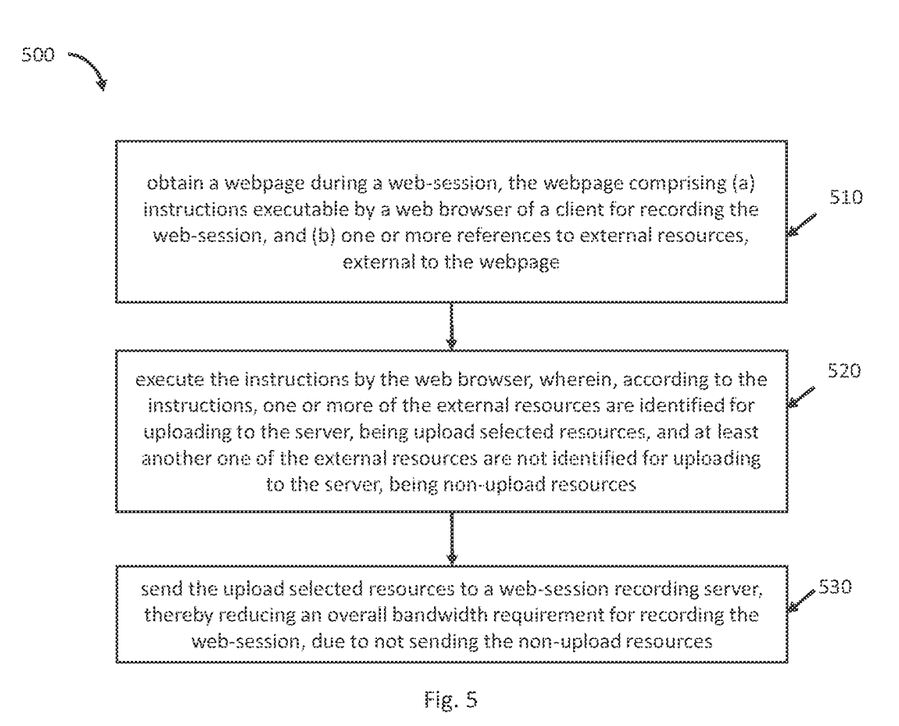
FIG. 5 is a flowchart illustrating one example of a sequence of operations carried out for an agentless client web-session recording, in accordance with the presently disclosed subject matter.

In embodiments of the presently disclosed subject matter, fewer, more and/or different stages than those shown in FIG. 4-5 may be executed. In embodiments of the presently disclosed subject matter one or more stages illustrated in FIG. 4-5 may be executed in a different order and/or one or more groups of stages may be executed simultaneously. FIGS. 1-3 illustrate a general schematic of the system architecture in accordance with an embodiment of the presently disclosed subject matter. Each module in FIGS. 1-3 can be made up of any combination of software, hardware and/or firmware that performs the functions as defined and explained herein. The modules in FIGS. 1-3 may be centralized in one location or dispersed over more than one location. In other embodiments of the presently disclosed subject matter, the system may comprise fewer, more, and/or different modules than those shown in FIGS. 1-3.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, is a block diagram schematically illustrating one example of an environment of a web-session recording system, in accordance with the presently disclosed subject matter.

According to certain examples of the presently disclosed subject matter, a system 100 can be provided. System 100, also referred to herein as web-session recording system, may be a server that is capable of recording web-sessions taking place on one or more clients 110 (e.g. client 110-*a*, client 110-*b*, . . . , client 110-*n*). Client 110 is also referred to herein as agentless client web-session recording system. Each web-session is a user's interaction with a website, browsing one or more web pages on one of clients 110 (e.g. client 110-*a*, client 110-*b*, . . . , client 110-*n*). The web pages may be provided to one or more of clients 110 (e.g. client 110-*a*, client 110-*b*, . . . , client 110-*n*) by a web server. In some embodiments, the web server is part of system 100, i.e. system 100 creates and provides the web pages to one or more of clients 110 (e.g. client 110-*a*, client 110-*b*, . . . , client 110-*n*). In other embodiments, the web server is external to system 100 and may provide the web pages directly to clients 110 or provide the web pages to system 100 and system 100 provides the web pages to one or more of clients 110 (e.g. client 110-*a*, client 110-*b*, . . . , client 110-*n*).

Each client of clients 110 (e.g. client 110-*a*, client 110-*b*, . . . , client 110-*n*) may be a computation device (e.g. a desktop computer, a laptop, a smartphone, a tablet, etc.), capable of running a web browser (i.e. a wide purpose application used for browsing websites in order for a user of the computation device to view web pages), a web based application (i.e. a dedicated application used to browse specific web pages) or similar applications used to consume web pages or other content containing references to external resources during a web-session.

Each web page of web pages 120 (e.g. web page 120-*a*, web page 120-*b*, . . . web page 120-*n*) may contain references to one or more resources 160 (e.g. resource 160-*a*, resource 160-*b*, . . . , resource 160-*n*), also referred herein as external resources 160. Each resource of resources 160 (e.g. resource 160-*a*, resource 160-*b*, . . . , resource 160-*n*) is content that is required for correctly displaying the web page but resides outside of the web page, and is retrieved and displayed (as part of the web-page) by the web-browser upon loading the web-page (for example: the content may be a video file residing on a content server that is external to the web page). Resources 160 (e.g. resource 160-*a*, resource 160-*b*, . . . , resource 160-*n*) may be image files, Cascading Style Sheets (CSS), video files, etc.

Web pages 120 (e.g. web page 120-*a*, web page 120-*b*, . . . , web page 120-*n*) may additionally contain instructions executable by a web browser for recording a web-session, wherein executing the instructions results in one or more of resources 160 (e.g. resource 160-*a*, resource 160-*b*, . . . , resource 160-*n*) being uploaded to system 100. In a particular example, only a subset of the resources 160 is loaded from each client of client 110, so that at least one resource 160 is not uploaded to the system by all of clients 110.

It is to be noted that web pages 120 (e.g. web page 120-*a*, web page 120-*b*, . . . web page 120-*n*) may be instances of the same web page. Specifically, it may be that web pages 120 (e.g. web page 120-*a*, web page 120-*b*, . . . , web page 120-*n*) contain external references that reference, at least in part, similar resource. For example: reference 130-*a*, reference 140-*a* and reference 150-*a* may all (or some) reference the same resource 160-*a*. In a similar way, reference 130-*b*, reference 140-*b* and reference 150-*b* may all (or some) reference the same resource 160-*b* and reference 130-*a*, reference 140-*a* and likewise reference 130-*n*, reference 140-*n* and reference 150-*n* may all (or some) reference the same resource 160-*n*.

It is further noted that external resources 160 (e.g. resource 160-*a*, resource 160-*b*, . . . , resource 160-*n*) may be changed (e.g. deleted, replaced, etc.) over time, specifically they may change between the time of recording the web-session by system 100 and the time of replay of the same web-session. This may result in a replayed web-session that does not appear identical to the actual web-session the user experienced at the time it was recorded, due to the fact that retrieving the external resources 160 (e.g. resource 160-*a*, resource 160-*b*, . . . , resource 160-*n*) upon replaying the web-session can result in obtaining the current content referred to by one or more of the references (e.g. reference 130-*a*, 130-*b*, . . . , 130-*n*, 140-*a*, 140-*b*, . . . , 140-*n*, 150-*a*, 150-*b*, . . . , 150-*n*), instead of the content that existed at the time the web-session was recorded. For example, web page 120-*a* may contain reference 130-*a*, which may be a URL referencing resource 160-*a*, which may be an image file. At the time web page 120-*a* was recorded, resource 160-*a* contained a first image file. At the time web page 120-*a* was replayed, resource 160-*a* contained a second image file, resulting in a replay that does not represent the user's experience as of the time of recording.

Prior art web-session recording solutions may capture external resources 160 (e.g. resource 160-*a*, resource 160-*b*, . . . , resource 160-*n*) as of the time of the web-session recording and upload them to be stored in a location accessible to a replay server. However, sending all of the external resources 160 from each such client of clients 110 (e.g. client 110-*a*, client 110-*b*, . . . , client 110-*n*) results in the degradation of the performance of the clients' 110 network access.

System 100 takes advantage of the fact that one or more instances of the same web page 120 (e.g. web page 120-*a*, web page 120-*b*, . . . , web page 120-*n*) is loaded on a plurality of clients 110 (e.g. client 110-*a*, client 110-*b*, . . . , client 110-*n*), thus each of clients 110 (e.g. client 110-*a*, client 110-*b*, . . . , client 110-*n*) may upload to server 100 only part of the resources referenced by the copy of web page 120 it is running while achieving the recording of all resources 160 (e.g. resource 160-*a*, resource 160-*b*, . . . , resource 160-*n*) on server 100. Consequently, this will result in reducing the usage of the up-link connection of the network interface of each separate client of clients 110 (e.g. client 110-*a*, client 110-*b*, . . . , client 110-*n*) while in aggregate uploading all of resources 160 (e.g. resource 160-*a*, resource 160-*b*, . . . , resource 160-*n*) by the plurality of clients 110 that each send only a part thereof. This will ensure an accurate replay of a selected web-session, as resources 160 (e.g. resource 160-*a*, resource 160-*b*, resource 160-*n*) are captured as of the time of the web-session recording, while reducing up-link consumption of each client 110.

Server 100 may replay the recorded web-session by utilizing the uploaded resources 160 (e.g. resource 160-*a*, resource 160-*b*, . . . , resource 160-*n*) received from at least two of clients 110 (e.g. client 110-*a*, client 110-*b*, . . . , client 110-*n*), including at least two of the resources 160 (e.g. resource 160-*a*, resource 160-*b*, . . . , resource 160-*n*), wherein at least one resource of the at least two resources 160 (e.g. resource 160-*a*, resource 160-*b*, . . . , resource 160-*n*) is received from a first client of clients 110 (e.g. client 110-*a*, client 110-*b*, . . . , client 110-*n*) and a second resource of the at least two resources 160 (e.g. resource 160-*a*, resource 160-*b*, . . . , resource 160-*n*) is received from a second client of clients 110 (e.g. client 110-*a*, client 110-*b*, . . . , client 110-*n*).

An example of the above representation is provided: client 110-*a* may be a smartphone running a web browser application. A user of client 110-*a* may be using a web browser (e.g. Google Chrome, Internet Explorer, Mozilla Firefox, etc.) in order to view an instance of web page 120, e.g. web page 120-*a*, which contains reference 130-*a* to resource 160-*a* (an image file) and reference 130-*b* to resource 160-*b* (a video file). Client 110-*b* may be a desktop computer running a web browser application. A user of client 110-*b* may be using a web browser in order to view an instance of web page 120, e.g. web page 120-*b*, which contains reference 140-*a* to resource 160-*a* (an image file) and reference 140-*b* to resource 160-*b* (a video file). System 100 may utilize client 110-*a* to upload resource 160-*a* and client 110-*b* to upload resource 160-*b*, thus each client uploads only one resource, instead of two in this example (while noting that in many cases there are tens, or even more external resources in a given webpage). When system 100 replays the web-session of either the user of client 110-*a* or of the user of client 110-*b*, it may use recorded resource 160-*a* and resource 160-*b* in order to accurately replay the either of the recorded web-sessions.

Turning to FIG. 2, there is shown a block diagram schematically illustrating one example of a system for web-session recording, in accordance with the presently disclosed subject matter.

According to certain examples of the presently disclosed subject matter, system 100 can comprise, or be otherwise associated with, a data repository 210 (e.g. a database, a storage system, a memory including Read Only Memory—ROM, Random Access Memory—RAM, or any other type of memory, etc.) configured to store data, including, inter alia, webpage instructions, references to resources 160 and resources 160 associated with a webpage that are uploaded to system 100. The resources 160 may be utilized in order to replay a web-session by a replay module 250, as further detailed herein.

System 100 may further comprise a network interface 220 (e.g. a network card, a WiFi client, a LiFi client, 3G/4G client, or any other component), enabling system 100 to communicate over a network with one or more clients 110 (e.g. client 110-*a*, client 110-*b*, . . . , client 110-*n*), web-servers, etc.

System 100 further comprises a processing resource 230. Processing resource 230 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant system 100 resources and for enabling operations related to system 100 resources.

The processing resource 230 can contain one or more of the following modules: web page management module 240, replay module 250 and resource completion module 260.

Web page management module 240 can be configured to provide a web page 120 (e.g. web page 120-*a*, web page 120-*b*, . . . , web page 120-*n*), send the web page 120 (e.g. web page 120-*a*, web page 120-*b*, . . . , web page 120-*n*) to a plurality of clients 110 (e.g. client 110-*a*, client 110-*b*, . . . , client 110-*n*) and receive, from each of clients 110 (e.g. client 110-*a*, client 110-*b*, . . . , client 110-*n*) upload resources 160 (e.g. resource 160-*a*, resource 160-*b*, . . . , resource 160-*n*), as further detailed herein, inter alia with reference to FIG. 4.

Replay module 250 can be configured to utilize the upload resources 160 (e.g. resource 160-*a*, resource 160-*b*, . . . , resource 160-*n*) received from at least two of clients 110 (e.g. client 110-*a*, client 110-*b*, . . . , client 110-*n*) in order to replay a web-session, as further detailed herein, inter alia with reference to FIG. 4.

Resource completion module 260 can be configured to directly obtain one or more of the resources 160 (e.g. resource 160-*a*, resource 160-*b*, . . . , resource 160-*n*) not received as part of the uploaded resources 160 (e.g. resource 160-*a*, resource 160-*b*, . . . , resource 160-*n*), for example: in order to complete the upload of all resources 160 (e.g. resource 160-*a*, resource 160-*b*, . . . , resource 160-*n*) referenced from a certain web page 120 (e.g. web page 120-*a*, web page 120-*b*, . . . , web page 120-*n*), when not all resources 160 (e.g. resource 160-*a*, resource 160-*b*, . . . , resource 160-*n*) referenced from web page 120 (e.g. web page 120-*a*, web page 120-*b*, . . . , web page 120-*n*) have been uploaded from clients 110 (e.g. client 110-*a*, client 110-*b*, . . . , client 110-*n*) from some reason.

Attention is drawn to FIG. 3, showing a block diagram schematically illustrating one example of an agentless client web-session recording system, in accordance with the presently disclosed subject matter.

According to certain examples of the presently disclosed subject matter, client 110 can comprise, or be otherwise associated with, a local data repository 310 (e.g. a database, a storage system, a memory including Read Only Memory—ROM, Random Access Memory—RAM, or any other type of memory, etc.) configured to store data, including, inter alia, web pages, references to resources 160 and resources 160 associated with a webpage to be uploaded to system 100.

Client 110 may further comprise a client network interface 320 (e.g. a network card, a WiFi client, a LiFi client, 3G/4G client, or any other component), enabling client 110 to communicate over a network with system 100.

Client 110 further comprises a processing resource 330. Processing resource 330 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant client 110 resources and for enabling operations related to client 110 resources.

The processing resource 330 can contain a resource upload management module 340.

Upload management module 340 can be configured to obtain a web page 120 (e.g. web page 120-*a*, web page 120-*b*, . . . , web page 120-*n*), execute instructions that are comprised within web page 120 (e.g. web page 120-*a*, web page 120-*b*, . . . , web page 120-*n*) and send resources 160 (e.g. resource 160-*a*, resource 160-*b*, . . . , resource 160-*n*) to system 100, as further detailed herein, inter alia with reference to FIG. 5.

FIG. 4 is a flowchart illustrating one example of a sequence of operations carried out for web-session recording, in accordance with the presently disclosed subject matter.

According to some examples of the presently disclosed subject matter, the web-session recording system 100 can be configured to perform a web page management and web-session replay process 400, e.g. utilizing the web page management module 240 and the replay module 250.

For this purpose, the web-session recording system 100 can be configured to provide a web page 120 (e.g. web page 120-*a*, web page 120-*b*, . . . , web page 120-*n*), each web page 120 (e.g. web page 120-*a*, web page 120-*b*, . . . , web page 120-*n*) comprising (a) one or more references to external resources 160 (e.g. resource 160-*a*, resource 160-*b*, . . . , resource 160-*n*), external to the web page 120 (e.g. web page 120-*a*, web page 120-*b*, . . . , web page 120-*n*), and (b) instructions executable by a web browser for recording a web-session (referred to herein as "instructions"), wherein executing the instructions results in: a first subset of the external resources 160 (e.g. resource 160-*a*, resource 160-*b*, . . . , resource 160-*n*) being uploaded to the web-session recording system 100 (the first subset being referred to herein as upload selected resources 160, and at least a second subset of the external resources 160 (other than the first subset) not being uploaded to the web-session recording system 100 (the second subset being referred to herein as non-upload resources 160) (block 410).

In some cases, the upload selected resources 160 are identified by random selection thereof out of all of the external resources 160 (e.g. resource 160-*a*, resource 160-*b*, . . . , resource 160-*n*).

In other cases, the upload selected resources 160 are identified by random selection thereof out of a subset of the external resources 160 not received as part of the received upload selected resources 160, the subset being identified by the instructions.

In some cases, the upload selected resources 160 are specifically identified within the instructions out of a subset of the external resources 160 not received as part of the received upload selected resources 160.

In some cases, a number of the upload selected resources 160 is limited for each client of clients 110 (e.g. client 110-*a*, client 110-*b*, . . . , client 110-*n*), according to at least one of the following: (a) type of a device of the client 110 (e.g. client 110-*a*, client 110-*b*, . . . , client 110-*n*); (b) type of the web browser loading the web-page; (c) bandwidth of a connection of the device on which the web-page is loaded; (d) number of the external resources 160 referred to by the web-page; (e) size of the external resources 160 referred to by the web-page and/or (f) time of day.

In some cases, a size of the upload selected resources 160 is limited for each client of clients 110 (e.g. client 110-*a*, client 110-b, ..., client 110-n), in according to at least one of the following: (a) type of a device of the client 110 on which the web-page is loaded; (b) type of the web browser loading the web-page; (c) bandwidth of a connection of the device on which the web-page is loaded; (d) number of the external resources 160 referred to by the web-page; (e) size of the external resources 160 referred to by the web-page and/or (f) time of day.

In some cases, the web page 120 (e.g. web page 120-a, web page 120-b, ..., web page 120-n) further comprises a link to an external instructions resource, capable of providing the instructions, and wherein the instructions are loaded from the external instruction resource. This allows the management of the instructions (e.g. adding new instructions, changing the instructions, deleting the instructions) without changing the content of web pages 120 (e.g. web page 120-a, web page 120-b, ..., web page 120-n). An example of an external instruction resource may be a tag management system such as: Google Tag Manager, Ensighten, etc.

After providing a web page 120 (e.g. web page 120-a, web page 120-b, ..., web page 120-n), system 100 may be further configured to send the webpage to a plurality of clients 110 (e.g. client 110-a, client 110-b, ..., client 110-n), each requesting the web page 120 (e.g. web page 120-a, web page 120-b, ..., web page 120-n) during a corresponding web-session (block 420).

After sending the web page 120 (e.g. web page 120-a, web page 120-b, ..., web page 120-n), the system 100 may be further configured to receive, from each of clients 110 that received the web-page, the upload selected resources 160 (block 430).

For example: client 110-a and client 110-b, are both displaying instances of web page 120, i.e. web page 120-a and 120-b respectively. Both instances of web page 120 have references to resources 160-a and 160-b, i.e. reference 130-a and 130-b of web page 120-a and references 140-a and 140-b of web page 120-b. System 100 may receive an upload of resource 160-a from client 110-a and an upload of resource 160-b via client 110-b.

System 100 may optionally utilize the upload selected resources 160 received from at least two of clients 110 (e.g. client 110-a, client 110-b, ..., client 110-n) in order to replay a selected web-session of the web-sessions, including at least two of the external resources 160 (e.g. resource 160-a, resource 160-b, ..., resource 160-n), wherein at least a first external resource of the external resources 160 is received from a first client of clients 110 (e.g. client 110-a, client 110-b, ..., client 110-n) and a second external resource of the external resources 160 is received from a second client of clients 110 (e.g. client 110-a, client 110-b, ..., client 110-n) (block 440).

Continuing the above example: System 100 may replay a recorded web-session of web page 120-a, as recorded on client 110-a, including resource 160-a and 160-b. It is to be noted that the replay of client 110-a, includes resource 160-b, that was uploaded from client 110-b.

It is to be noted that, with reference to FIG. 4, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

Turning to FIG. 5, there is shown a flowchart illustrating one example of a sequence of operations carried out for an agentless client web-session recording, in accordance with the presently disclosed subject matter.

According to some examples of the presently disclosed subject matter, client 110 can be configured to perform a resource upload management process 500, e.g. utilizing the resource upload management module 340.

For this purpose, client 110 can be configured to obtain a web page 120 (e.g. web page 120-a, web page 120-b, ..., web page 120-n) during a web-session, the web page 120 (e.g. web page 120-a, web page 120-b, ..., web page 120-n) comprising (a) instructions executable by a web browser of a client 110 (e.g. client 110-a, client 110-b, ..., client 110-n) for recording the web-session, and (b) one or more references to external resources 160 (e.g. resource 160-a, resource 160-b, ..., resource 160-n), external to the web page 120 (e.g. web page 120-a, web page 120-b, ..., web page 120-n) (block 510).

After obtaining web page 120 (e.g. web page 120-a, web page 120-b, ..., web page 120-n), client 110 may be further configured to execute the instructions by the web browser executing thereon, wherein, according to the instructions, a first subset of the external resources 160 (e.g. resource 160-a, resource 160-b, ..., resource 160-n) is identified for uploading to the server 100, being upload selected resources 160, and a second subset of the external resources 160 (e.g. resource 160-a, resource 160-b, ..., resource 160-n) are not identified for uploading to the server 100, being non-upload resources 160 (block 520).

In some cases, the upload selected resources 160 are identified by random selection thereof out of all of the external resources 160 (e.g. resource 160-a, resource 160-b, ..., resource 160-n).

In other cases, the upload selected resources 160 are identified by random selection thereof out of a subset of the external resources 160 (e.g. resource 160-a, resource 160-b, ..., resource 160-n), the subset being identified by the instructions.

In some cases, the upload selected resources 160 are specifically identified within the instructions.

In some cases, a number of the upload selected resources 160 is limited, in according to at least one of the following: (a) type of a device of the client 110 (e.g. client 110-a, client 110-b, ..., client 110-n); (b) type of the web browser running on the device; (c) bandwidth of a connection of the device; (d) number of the external resources 160 (e.g. resource 160-a, resource 160-b, ..., resource 160-n); (e) size of the external resources 160 (e.g. resource 160-a, resource 160-b, ..., resource 160-n) and (f) time of day.

In some cases, a size of the upload selected resources is limited, in according to at least one of the following: (a) type of a device of the client 110 (e.g. client 110-a, client 110-b, ..., client 110-n); (b) type of the web browser running on the device; (c) bandwidth of a connection of the device; (d) number of the external resources 160 (e.g. resource 160-a, resource 160-b, ..., resource 160-n); (e) size of the external resources 160 (e.g. resource 160-a, resource 160-b, ..., resource 160-n) and (f) time of day.

In some cases, the webpage further comprises a link to an external instructions resource, capable of providing the instructions, and wherein the instructions are loaded from the external instruction resource. This allows the management of the instructions (e.g. adding new instructions, changing the instructions, deleting the instructions) without changing the content of web pages 120 (e.g. web page 120-a, web page 120-b, ..., web page 120-n). An example of an external instruction resource may be a tag management system such as: Google Tag Manager, Ensighten, etc.

After executing the instructions, client 110 may be further configured to send the upload selected resources 160 to a web-session recording server 100, thereby reducing an overall bandwidth requirement for recording the web-session, due to not sending the non-upload resources 160 (block 530).

For example: client 110-*a* and client 110-*b*, are both displaying instances of web page 120, i.e. web page 120-*a* and 120-*b* respectively. Both instances of web page 120 have references to resources 160-*a* and 160-*b*, i.e. reference 130-*a* and 130-*b* of web page 120-*a* and references 140-*a* and 140-*b* of web page 120-*b*. System 100 may receive an upload of resource 160-*a* from client 110-*a* and an upload of resource 160-*b* via client 110-*b*. Furthermore, system 100 may than replay a recorded web-session of web page 120-*a*, as recorded on client 110-*a*, including resource 160-*a* and 160-*b*. It is to be noted that the replay of client 110-*a*, includes resource 160-*b*, that was uploaded from client 110-*b*.

It is to be noted that, with reference to FIG. 5, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A web-session recording, system comprising at least one processing resource configured to:
provide a webpage, the webpage comprising (a) one or more references to external resources, external to the webpage, and (b) instructions executable by a web browser for recording a web-session, wherein executing the instructions results in one or more of the external resources being uploaded to the web-session recording system, being upload selected resources, and at least another one of the external resources not being uploaded to the web-session recording system, being non-upload resources;
send the webpage to a plurality of clients, each requesting the webpage during a corresponding web-session; and
receive, from each of the clients, the respective upload selected resources, so that the upload selected resources received from a first client of the clients are different than the uploaded selected resources received from a second client of the clients, other than the first client.

2. The web-session recording system of claim 1, wherein the processing resource is further configured to utilize the upload selected resources received from at least two of the clients in order to replay a selected web-session of the web-sessions, including at least two of the external resources, wherein at least a first external resource of the external resources is received from the first client of the clients and a second external resource of the external resources is received from the second client of the clients.

3. The web-session recording system of claim 1, wherein the upload selected resources are identified by random selection thereof out of all of the external resources.

4. The web-session recording system of claim 1, wherein the upload selected resources are identified by random selection thereof out of a subset of the external resources not received as part of the received upload selected resources, the subset being identified by the instructions.

5. The web-session recording system of claim 1, wherein the upload selected resources are specifically identified within the instructions out of a subset of the external resources not received as part, of the received upload selected resources.

6. The web-session recording system of claim 1, wherein a number of the upload selected resources is limited for each client of the clients, in according to at least one of the following: (a) type of a device of the client; (b) type of the web browser; (c) bandwidth of a connection of the device; (d) number of the external resources; (e) size of the external resources and (t) time of day.

7. The web-session recording system, of claim 1, wherein a size of the upload selected resources is limited for each client of the clients, in according to at least one of the following: (a) type of a device of the client; (b) type of the web browser; (c) bandwidth of a connection of the device; (d) number of the external resources; (e) size of the external resources and (f) time of day.

8. The web-session recording system of claim I, further comprising a software component configured to obtain one or more of the external resources not received as part of the received upload selected resources.

9. The web-session recording system of claim 1, wherein the instructions are JavaScript instructions.

10. The web-session recording system of claim 1, wherein the webpage further comprises a link to an external resource, capable of providing the instructions, and wherein the instructions are loaded from the external resource.

11. A web-session recording method comprising:
providing a webpage, by a processing resource, the webpage comprising (a) one or more references to external resources, external to the webpage, and (b) instructions executable by a web browser for recording a web-session, wherein executing the instructions results in one or more of the external resources being uploaded to the web-session recording system, being upload selected resources, and at least another one of the external resources not being uploaded to the web-session recording system, being non-upload resources;
sending, by the processing resource, the webpage to a plurality of clients, each requesting the webpage during a corresponding web-session; and
receiving, by the processing resource, from each of the clients, the respective upload selected resources, so that the upload selected resources received from a first client of the clients are different than the uploaded selected resources received from a second client of the clients, other than the first client.

12. The web-session recording method of claim 11, further comprising utilizing, by the processing resource, the upload selected resources received from at least two of the clients in order to replay a selected web-session of the web-sessions, including at least two of the external resources, wherein at least a first external resource of the external resources is received from the first client of the clients and a second external resource of the external resources is received from the second client of the clients.

13. The web-session recording method of claim 11, wherein the upload selected resources are identified by random selection thereof out of all of the external resources.

14. The web-session recording method of claim 11, wherein the upload selected resources are identified by random selection thereof out of a subset of the external resources not received as part of the received upload selected resources, the subset being identified by the instructions.

15. The web-session recording method of claim 11, wherein the upload selected resources are specifically identified within the instructions out of a subset of the external resources not received as part of the received upload selected resources.

16. The web-session recording method of claim 11, wherein a number of the upload selected resources is limited for each client of the clients, in according to at least one of the following: (a) type of a device of the client; (b) type of the web browser; (c) bandwidth of a connection of the device; (d) number of the external resources; (e) size of the external resources and (f) time of day.

17. The web-session recording method of claim 11, wherein a size of the upload selected resources is limited for each client of the clients, in according to at least one of the following: (a) type of a device of the client; (b) type of the web browser; (c) bandwidth of a connection of the device; (d) number of the external resources; (e) size of the external resources and (f) time of day.

18. The web-session recording method of claim 11, further comprising obtaining, by a software component, one or more of the external resources not received as part of the received upload selected resources.

19. The web-session recording method of claim 11, wherein the webpage further comprises a link to an external resource, capable of providing the instructions, and wherein the instructions are loaded from the external resource.

20. A non-transitory computer readable storage medium having computer readable program code embodied therewith, the computer readable program code, executable by at least one processor of a computer to perform a method for web-session recording, the method comprising:
  providing a webpage, by a processing resource, the webpage comprising (a) one or more references to external resources, external to the webpage, and (b) instructions executable by a web browser for recording a web-session, wherein executing the instructions results in one or more of the external resources being uploaded to the web-session recording system, being upload selected resources, and at least another one of the external resources not being uploaded to the web-session recording system, being non-upload resources;
  sending, by the processing resource, the webpage to a plurality of clients, each requesting the webpage during a corresponding web-session; and
  receiving, by the processing resource, from each of the clients, the respective upload selected resources, so that the upload selected resources received from a first client of the clients are different than the uploaded selected resources received from a second client of the clients, other than the first client.

\* \* \* \* \*